(No Model.)

A. DAUPHINAIS.
HITCHING DEVICE FOR ANIMALS.

No. 453,830. Patented June 9, 1891.

Witnesses
Geo. W. Toury
Wm Kolug

Inventor
Alfred Dauphinais
By H. G. Underwood
Attorneys

UNITED STATES PATENT OFFICE.

ALFRED DAUPHINAIS, OF HURLEY, WISCONSIN, ASSIGNOR OF ONE-HALF TO ALEXANDRE LALOND, OF SAME PLACE.

HITCHING DEVICE FOR ANIMALS.

SPECIFICATION forming part of Letters Patent No. 453,830, dated June 9, 1891.

Application filed December 22, 1890. Serial No. 375,484. (No model.)

*To all whom it may concern:*

Be it known that I, ALFRED DAUPHINAIS, a citizen of the United States, and a resident of Hurley, in the county of Ashland, and in the State of Wisconsin, have invented certain new and useful Improvements in Hitching Devices for Animals; and I do hereby declare that the following is a full, clear, and exact description thereof.

My invention relates to hitching devices for animals; and it consists in certain peculiarities of construction and combination of parts to be hereinafter described with reference to the accompanying drawings, and subsequently claimed.

Figure 1:
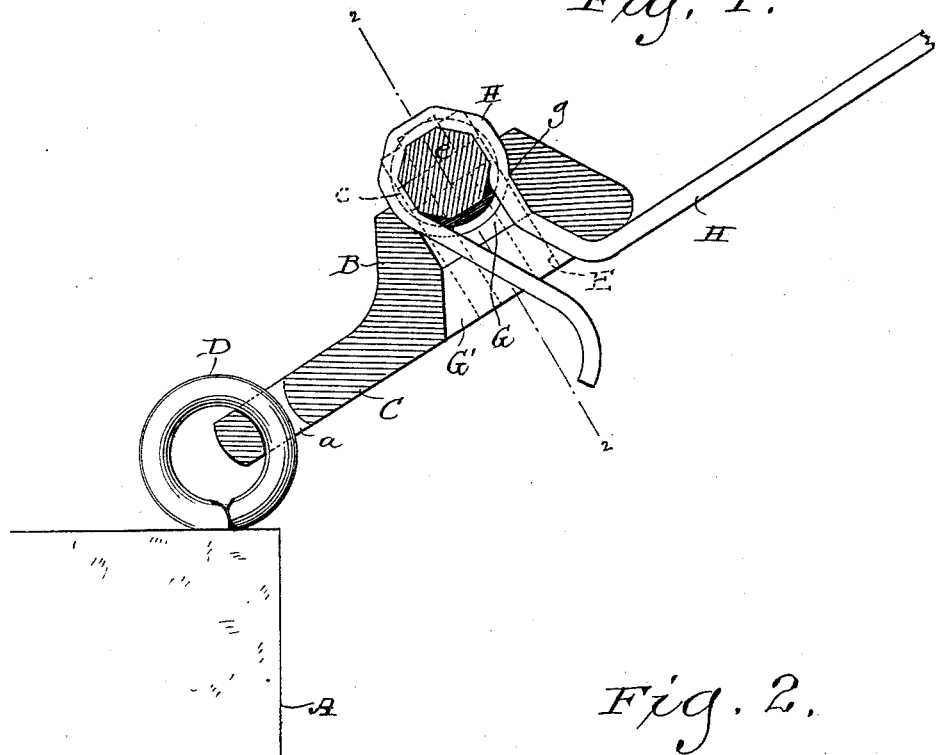
Figure 3:
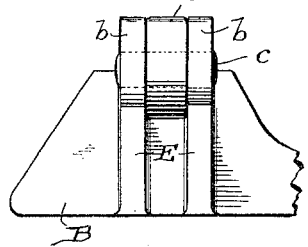
Figure 2:
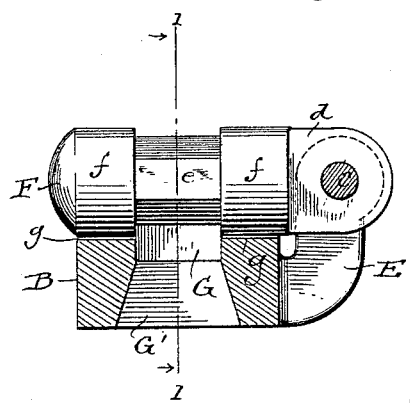

In the drawings, Figure 1 represents a vertical longitudinal section of my device, the section being taken on line 1 1 of the succeeding figure; and Fig. 2, an end view of said device, partly in transverse section on line 2 2 of the preceding figure. Fig. 3 is a detail side elevation of a portion thereof.

Referring by letter to the drawings, A represents a manger, post, sidewalk, or any other suitable support, and B represents a block made of iron or other suitable material, the shank C of which is preferably perforated, as shown at $a$, and loosely secured to the said support A by means of a ring, staple, or eye-bolt D, or other fastening device. Secured to or formed integrally with the said block B is a bifurcated bracket E, the upper portions of which project above the top of the block B and form ears $b\ b$, and pivoted between these ears by means of a pivot $c$ is the shank $d$ of the clamping-pin F, said pin being reduced in diameter or cut away at its central portion $e$, leaving collars $f\ f$ on each side of the center, and the central portion $e$ of said pin F is preferably formed with polygonal faces, as shown, and there being a transverse, concave, or rounded recess or seat $g$ in the top of the block B to receive the pin F, said block being also provided with a transverse aperture G, the lower portion G' of which is enlarged somewhat to facilitate the insertion of hitching-strap H. The width of the aperture G corresponds to the length of the central portion $e$ of the pin F, which comes just above the apertures G, and is preferably the width of an ordinary hitching-strap, but which may be made any width found desirable.

In hitching a horse or any other animal to my device the end of the strap H is passed up through the aperture G in the block B, over the pin F, and then down through the said aperture G, forming a loop around the polygonal portion $e$ of the pin F, and thereby fastening the said strap H, to which the animal is secured. When the animal is to be unhitched, the pin F is raised on its pivot $c$, thereby releasing the strap and permitting the same to be drawn out of the said aperture G; but unless the pin is so raised the harder the strap H is pulled the more firmly will it be wedged between the pin F and the side walls of the said concave recess $g$, the collars $f\ f$ of the pin on each side of the strap preventing sidewise motion of the latter, and the polygonal faces of the reduced central portion $e$ of the pin serving as an additional guard to prevent the strap from slipping under pressure.

Although I have shown and described the central portion $e$ of the pin F as being polygonal in form and ordinarily prefer such form, for the reason stated, I do not limit myself thereto, as my device will operate successfully if the pin is of equal diameter throughout and of round or any other form in cross-section.

If found desirable, I may apply a similar device to the harness for the purpose of supporting the free end of the hitching or halter strap when not in use.

Having thus described my invention, what I claim as new, and desire to secure by Letters Patent, is—

1. In a hitching device for animals, the combination of an apertured block provided with a seat at one end of the aperture therein and a clamping-pin having one extremity thereof pivoted to the block in line with said seat, substantially as set forth.

2. In a hitching device for animals, the combination of an apertured block provided with a seat at one end of the aperture therein, a bracket at one side of the block and in line with said seat, and a clamping-pin having one extremity thereof pivoted to the bracket, substantially as set forth.

3. In a hitching device for animals, the combination of an apertured block provided with a seat transverse to the aperture therein, a bracket on one side of said block, and a clamping-pin pivoted to said bracket and having the central portion thereof reduced in diameter and polygonal in form, substantially as set forth.

In testimony that I claim the foregoing I have hereunto set my hand, at Hurley, in the county of Ashland and State of Wisconsin, in the presence of two witnesses.

ALFRED DAUPHINAIS.

Witnesses:
CHAS. W. CLEVELAND,
HENRY DUFFY.